(12) United States Patent
Kim et al.

(10) Patent No.: US 7,435,464 B2
(45) Date of Patent: Oct. 14, 2008

(54) ARTICLES COMPRISING AQUEOUS DISPERSIONS OF POLYUREAURETHANES

(75) Inventors: Young H. Kim, Hockessin, DE (US); Michael O'Neill, Middletown, DE (US); Jiazhong Chen, Boothwyn, PA (US); Portia D. Yarborough, Midlothian, VA (US)

(73) Assignee: Invista North America S.A.R.L., Wilmington, DE (US)

( * ) Notice: Subject to any disclaimer, the term of this patent is extended or adjusted under 35 U.S.C. 154(b) by 442 days.

(21) Appl. No.: 10/780,380

(22) Filed: Feb. 17, 2004

(65) Prior Publication Data

US 2004/0219318 A1    Nov. 4, 2004

Related U.S. Application Data

(60) Provisional application No. 60/448,971, filed on Feb. 20, 2003, provisional application No. 60/423,617, filed on Nov. 4, 2002.

(51) Int. Cl.
| | |
|---|---|
| B32B 27/00 | (2006.01) |
| B32B 27/40 | (2006.01) |
| B32B 1/08 | (2006.01) |
| B32B 1/14 | (2006.01) |
| B29D 22/00 | (2006.01) |
| B29D 23/00 | (2006.01) |
| B29C 39/00 | (2006.01) |
| B29C 41/00 | (2006.01) |

(52) U.S. Cl. .................. 428/35.7; 428/423.1; 428/36.9; 528/66; 528/59; 528/65; 264/299; 264/308; 264/319; 264/331.11; 264/331.16; 264/334

(58) Field of Classification Search ................ 428/35.7, 428/423.1, 36.9; 528/66, 59, 65; 264/299, 264/308, 319, 331.11, 331.16, 334
See application file for complete search history.

(56) References Cited

U.S. PATENT DOCUMENTS

| | | | |
|---|---|---|---|
| 3,178,310 A | 4/1965 | Berger et al. | |
| 3,919,173 A | 11/1975 | Coyner et al. | |
| 4,120,850 A * | 10/1978 | Pechhold | 528/66 |
| 4,127,513 A | 11/1978 | Bellis | |
| 4,139,567 A | 2/1979 | Pruckmayr | |
| 4,153,786 A | 5/1979 | Pruckmayr | |
| 4,228,272 A | 10/1980 | Del Pesco | |
| 4,235,751 A | 11/1980 | Del Pesco | |
| 4,292,226 A | 9/1981 | Wenzel et al. | |
| 4,431,763 A | 2/1984 | Reed | |
| 4,433,095 A | 2/1984 | Hombach | |
| 4,442,259 A | 4/1984 | Isgur et al. | |
| 4,444,976 A | 4/1984 | Rabito | |
| 4,501,852 A | 2/1985 | Markusch et al. | |
| 4,564,671 A | 1/1986 | Mueller | |
| 4,728,722 A | 3/1988 | Mueller | |
| 4,742,095 A | 5/1988 | Markusch et al. | |
| 4,764,553 A * | 8/1988 | Mosbach et al. | 524/591 |
| 5,198,523 A * | 3/1993 | Baumann et al. | 528/85 |
| 5,494,960 A | 2/1996 | Rolando et al. | |
| 5,997,969 A | 12/1999 | Gardon | |
| 5,998,540 A | 12/1999 | Lipkin et al. | |
| 2004/0171745 A1* | 9/2004 | Kim et al. | 524/589 |

FOREIGN PATENT DOCUMENTS

| | | |
|---|---|---|
| DE | 83-3346136 | 7/1985 |
| DE | 86-3606479 | 9/1987 |
| DE | 19708451 A1 | 9/1998 |
| EP | 0 282 771 | 9/1988 |
| WO | WO 00/61651 | 10/2000 |
| WO | WO 02 08327 | 1/2002 |

OTHER PUBLICATIONS

Kirk-Othmer Encyclopedia of Chemical Technology (4th Edition, vol. 10, pp. 624-638) John Wiley & Sons, Inc., New York, 1993.
B. K. Kim, Colloid. Polym. Sci., 274:599-611, 1996.
J.M. Hammond, et al., J. Polym. Sci., Part A, vol. 9, p. 295 (1971).
Hongzhi Zhang, et al., J. Appl. Poly. Sci., vol. 73, p. 2303 (1999).

* cited by examiner

Primary Examiner—Michael C Miggins
(74) Attorney, Agent, or Firm—Christina W. Geerlof

(57) ABSTRACT

Polyurethane particles dispersed in water can be used to make articles of commerce with reduced chance of chemical and biological allergic reaction to skin, and which exhibit improved puncture and tear resistance when compared to gloves made with other materials.

7 Claims, No Drawings

ARTICLES COMPRISING AQUEOUS DISPERSIONS OF POLYUREAURETHANES

This application claims the benefit of U.S. Provisional Application No. 60/448,971, filed on Feb. 20, 2003, and, U.S. Provisional Application No. 60/423,617, filed on Nov. 4, 2002, each of which is incorporated in its entirety as a part hereof for all purposes.

FIELD OF THE INVENTION

Polyurethane particles dispersed in water can be used to make articles of commerce with reduced chance of chemical and biological allergic reaction to skin, and which exhibit improved puncture and tear resistance when compared to gloves made with other materials.

BACKGROUND OF THE INVENTION

The production of elastomeric materials is well described in the art. (See for example Kirk-Othmer Encyclopedia of Chemical Technology, $4^{th}$ edition, volume 10, John Wiley & Sons, Inc., New York, 1993, pp.624-638.) Elastomeric materials, specifically spandex, contain urethane linkages with the following repeat structure:

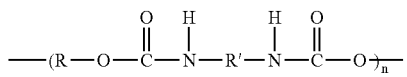

Most urethane polymers in current use for the manufacture of spandex are made by reacting hydroxy-terminated polyethers or polyesters with a diisocyanate at a molar ratio of about 1:1.4 to 1:2.5, followed by reaction of the resulting isocyanate-terminated prepolymer with one or more diamines to produce a high molecular weight urethane polymer. Small amounts of monofunctional amines may also be included to control polymer molecular weight. Mechanical properties may be affected by changing the particular polyester or polyether glycol, diisocyanate, diamine(s), and monoamine used; they can be further modified by changing the molecular weight of the glycol and by changing the glycol-diisocyanate molar ratio.

The long-chain urethane polymer molecules in spandex are substantially linear block copolymers comprising relatively long blocks in which molecular interactions are weak, interconnected by shorter blocks in which interactions are strong. The weakly interacting blocks, commonly referred to as soft segments, are from the polyether or polyester glycol component whereas the blocks having strong interactions result from diisocyanate and chain extender reactions and are referred to as hard segments. The chain extension reaction is usually a coupling reaction between the isocyanate and difunctional amines, resulting in a urea linkage. Thus, the resulting polymer of the combined hard- and soft-segments are known as polyureaurethane.

It is known that polyisocyanate polymers can be used to prepare aqueous polyurethane dispersions. Polyurethane dispersions are generally prepared by chain extending the reaction product of an organic diisocyanate or polyisocyanate and an organic compound having two or more active hydrogen atoms such as polyalkylene ether glycols, poly(alkylene ether) glycols, alkyd resins, polyesters and polyester amides, often using a small amount of an organic solvent. The diisocyanate is used in stoichiometric excess so that the reaction product, also referred to as a polyurethane/urea prepolymer, is isocyanate terminated. Examples of polyurethane prepolymer preparations are described in U.S. Pat. Nos. 3,178,310, 3,919,173, 4,442,259, 4,444,976, and 4,742,095, among others.

Polyurethane dispersions are reported as being useful for preparing such diverse materials as coatings and bonds in U.S. Pat. No. 4,292,226; flexible solvent barriers in U.S. Pat. No. 4,431,763; adhesives in U.S. Pat. No. 4,433,095; and films in U.S. Pat. No. 4,501,852. Films, or rather the process of dipping to make a film, can be a part of the processes for making many articles. Examples of film applications include gloves, organ bags, condoms, ostomy bags, and the like. While it is known that such applications can be made with polyurethane dispersions, conventional polyurethane dispersions have sometimes been found to have insufficient physical or handling properties to make them a preferred material for such applications. Also, the use of certain relatively high-boiling solvents, such as N-methyl-2-pyrrolidone, can have adverse effects for some applications.

Polyurethanes are the reaction product of a polyalcohol and a polyisocyanate. Typically, the polyisocyanates used to prepare aqueous polyurethane dispersions have been aliphatic isocyanates such as those disclosed in U.S. Pat. No. 5,494,960. Even though aromatic polyisocyanates such as toluene diisocyanate (TDI) and methylene diphenyldiisocyanate (MDI) as well as polymethylene polyphenylisocyanate (PMDI) are also known to be useful, the aliphatic isocyanate was found to have much higher stability toward hydrolysis while the prepolymer is dispersed in water. Thus, it is generally believed that the reaction between the isocyanate and the difunctional amine takes place in a more controlled and predictable manner.

Films prepared from natural rubber latex are common, but are considered to have properties which are desirable from the perspective of comfort and utility. Unfortunately, natural rubber latex also includes proteins and other materials, such as sulfur containing curing agents, which can be irritating to the skin, and which may cause severe allergic reactions in some people.

PCT International Application No. WO 00/61651, published Oct. 19, 2000, discloses polyurethane films and dispersions for their preparation. The dispersion is prepared from a polyurethane prepolymer formulation including a diisocyanate and an active hydrogen containing material. The dispersion is formed in a two or more step process wherein, in a first step, the prepolymer is formed and, in a subsequent step, an aqueous dispersion of the prepolymer is formed, in the presence of an anionic surfactant, both steps occurring in the substantial absence of an organic solvent.

Elastic films with good moisture management can provide protection from the environment, such as germs and chemicals. Particularly with the increased potential threat from chemical and biological agents, the need of such materials is ever increasing. Recent incidents has shown need for a comfortable gloves, which can be worn by law enforcement and postal workers for a long period of time. Latex gloves usually have low puncture resistance, and moreover may pose additional health risks, including fatal allergic reactions by certain individuals. Nitrile gloves have good puncture resistance, but high modulus, so they can cause fatigue with long term use.

Polyurethane elastomers may offer an alternative material choice, but some of polyurethane gloves are found to get weak when it is exposed to water or rubbing alcohol. This would hinder the long term use of such gloves.

We have found that by carefully formulating a polyurethane, gloves with many desired properties could be obtained.

SUMMARY OF THE INVENTION

The present invention discloses articles of commerce comprising aqueous polyureaurethane dispersions. These articles have tensile strengths greater than 2030 psi, puncture strengths of greater than 200 lbs/in, and tear strength per thickness of greater than 20 N/mm. They also show improved solvent resistance. A process for producing these articles is also disclosed, said process comprising the steps of:
- a) dipping a mold into a coagulant solution and drying at an elevated temperature;
- b) dipping the coagulant solution-coated mold into an aqueous polyureaurethane dispersion and drying;
- c) subjecting the coated mold to a salt leaching bath; and
- d) drying the coated mold at elevated temperature before stripping the article off of said mold.

DETAILS OF THE INVENTION

This invention discloses the use of stable aqueous polyureaurethane dispersions, using THF *homo* and/or copolymer as a glycol and an aromatic diisocyanate, but does not require the use of chain extending agents, curing agents or crosslinking agents. In the dispersion process, a stable colloidal particle of elastomeric polyurethane is generated, which has a wide utility. The process is robust and relatively uncomplicated, in that it does not require a series of separate steps as disclosed in previous work (see for example WO 00/61651). Typically, for the generation of aqueous colloid of polyurethane, aliphatic isocyanate is preferred. (See generally B. K. Kim, Colloid. Polym. Sci. 274:599-611 (1996).) These aliphatic isocyanates are reacted with various glycols to form oligomeric prepolymers, and then are dispersed into water, containing an equivalent amount of diamine. The amount of diamine is added by equivalence to percent NCO as determined by n-butylamine titration and back calculation. The aliphatic isocyanates have relatively high stability in water so that the diamine reacts with the isocyanate to chain extend the prepolymer through urea linkages. See also co-owned and co-pending application Ser. No. 10/701,317, filed on Nov. 4, 2003, hereby incorporated in its entirety, application No. 60/423,478, filed on Nov. 4, 2002, which describes other aqueous polyureaurethane dispersions.

However, it has been found that by carefully choosing reagents and conditions, the desired amount of isocyanate to undergo hydrolysis can be controlled, and subsequently react with additional isocyanate to form high polymers (e.g., molecular weights that are adequate for free standing film formation, typically above 100,000, preferably above 200,000) without the addition of common aliphatic diamines, such as ethylene diamine and other diamines as described in B. K. Kim, Colloid. Polym. Sci., 274:599-611 (1996). This is important, because the reaction of diisocyanate with diamine in water is diffusion controlled, and it cannot be assured that all added amine is consumed during the reaction. Any unreacted amines, which remain in the material when made by other processes, can cause skin irritation or sensitivity in certain applications.

It has been found that the use of an aromatic diisocyanate under the right reaction temperature and dispersion conditions would be suitable to make the dispersions of this invention. Examples of aromatic diisocyanates are MDI, TDI, PMDI and the like. The amount of NCO % in the prepolymer determines the physical properties of final films produced from the dispersion. The preferred range of NCO % is 2 to 4%.

Another critical element enabling the stability and simplicity of the process is the careful manipulation of polarity of the soft segment. One soft segment, which provides a good dispersion, in combination with the conditions for the aqueous dispersion and the right hard segments, is low molecular weight PTMEG with selected acid-functional-group-containing-diols. Another applicable THF copolymer soft segment containing an adequate amount (generally 25 to 60 percent by weight) of ethylene glycol as a comonomer. Methods of preparing such copolymers are disclosed in U.S. Pat. Nos. 4,127,513, 4,139,567, 4,153,186, 4,228,272, 4,235,751; German Pat. Application Nos. DE 86-3606479 and DE 83-3346136; and J. M. Hammond, et al., J. Polym. Sci., Part A, Vol. 9, p. 295 (1971) and Hongzhi Zhang, et al., J. Appl. Polym. Sci., Vol. 73, p. 2303 (1999). An example of an acid-functional-containing-diol is 2,2' dimethanolpropionic acid (DMPA). The content of ethylene oxide comonomer in PTMEG is 25-60% by weight.

Such a dispersion could be made using hydrophilic soft segments. By hydrophilic soft segments is meant they are made by reacting polyurethane prepolymers with an ethylene glycol copolymer of THF with ethylene glycol content higher than 20%, or polyurethane prepolymers with PTMEG with a small amount of sterically-hindered acid containing diols. The preferred range of EO content in the copolymer is 25% to 60% by weight. The preferred hindered acid diol is DMPA. The preferred DMPA range is 3-5% by weight. The preferred molecular weight of the poly(EO-co-THF) is 1000-3500, and the most preferred molecular weight is 2000. The preferred molecular weight of PTMEG is 700-1500, and the most preferred molecular weight is 1000.

Generally, the dispersions of the current invention are made by mixing an isocyanate and glycol for several hours under nitrogen at temperatures about 90° C. (80° C. to 100° C.) to form a prepolymer. The shear rate and force to which the dispersion mixture is subjected is important, and is described in FIG. 1. If too much shear force is applied, the dispersion can become unstable and break apart. Generally, the preferred range of shear force is between 500 and 1700 Newtons. The mixing time is generally between 2 and 5 minutes.

Hindered acid diols (e.g., DMPA and others listed in Table 1 of B. K. Kim, Colloid. Polym. Sci., 274:599-611 (1996) can be added at this step as well. Other ways to add ionic content are by adding hindered acid diol salts (e.g., sodium dimethylolproprionate), adding sulfonates (e.g., 2-sodium 1,4 butanediol), or by the addition of cationic centers like the addition of tertiary amines with one alkyl and two alkylol groups. At the end of the mixing time, the amount of excess isocyanate in the prepolymer can be determined by n-butylamine titration and back calculation. After the reaction product is cooled to room temperature, solvents (generally water miscible organic solvents such as acetone and methyl ethyl ketone (MEK)) can optionally be used to dilute the prepolymer to approximately a 75% weight percent solution. This solution is pumped into a chilled (i.e., 0 to 10° C.) aqueous solution containing surfactant, which can be anionic, cationic or nonionic. The preferred surfactant is sodium dodecylbenzenesulfonate or Triton X 100 (Dow Chemical Co., Midland, Mich.). The preferred amount of surfactant is 0.1 to 2% by weight, with the most preferred amount being 0.5 to 1% by weight. When an acid-containing diol is used, a relatively mild, inorganic base (e.g., $NaHCO_3$, $Na(CO_3)_2$, NaAc (where Ac represents acetate), $NaH_2PO_4$ and the like) can also be added to improve the dispersion. These inorganic bases are relatively low in odor, and also tend not to be skin irritants. Alternatively, triethyl amine can be used as a base. In this case, using less than one equivalent of amine to the acid, to minimize any potential odor, is recommended. The dispersing water generally contains less than one equivalent of base to neutralize the acid in the DMPA, wherein the pH of the 1 mole aqueous solution does not exceed 10. The dispersion temperature is important for the small particle formation. The preferred dispersion temperature is 0 to 10° C. The solid content of the dispersion is 10-60%, and typically 10-30%. The solids content of the resulting dispersion is generally about 10-30 weight percent, determined by drying the sample in an oven at 100° C. for 2 hours and comparing the weights before and after drying.

The present invention also uses a urethane polymer comprising a polyester polyol, DMPA and a diisocyanate that is free of, substantially free of, or contains less than 2 percent urea units described by —R—N($R^2$)—C(O)—N($R^2$)—$R^1$, wherein R is an aromatic radical, $R^1$ is an aliphatic radical and $R^2$ is H or amide groups which can be designated as C(O)—N($R^2$)—R—.

This invention relates to these articles which are made from aqueous dispersions as described in co-pending and co-owned patent application Ser. No. 10/700,859, filed on Nov. 4, 2003, and application Ser. No. 10/701,317, filed on Nov. 4, 2003, hereby incorporated by reference in their entirety.

When used as films and gloves, these materials show improved resistance to solvents, including isopropyl alcohol and DMAc. There is also reduced off-gassing of the film materials, which makes these films and gloves generally acceptable for clean room use. Not only do these films and gloves demonstrate improved chemical and solvent resistance, they also show improved puncture and tear resistance as shown in the examples below. They generally have a modulus of 100% elongation (i.e., between about 200 and 500 psi), allowing the film or glove to be stretched easily. It also shows low set, allowing it to return to its original shape after stretching. The preferred thickness of the gloves is between 3 and 6 mil, but other thicknesses can be used.

The data below show that the materials of this invention have a softer stretch or a flatter stress-strain curve than other articles tested, being more like a natural rubber.

Definitions

Unless otherwise specified, all chemicals and reagents were used as received from Aldrich Chemical Company, Milwaukee, Wis.
MDI 4,4'-diphenylmethane diisocyanate
Poly(EO-co-TH F) poly(Ethylene Oxide-co-TH F)
NCO Isocyanate group
DMPA 2,2'-Bis(hydroxymethyl)propionic acid
MEK Methylethyl ketone (2-butanone)
TEA Triethylamine
SDBS Sodium dodecylphenylsulfate (*Is this Triton X 100?)

EXAMPLES

The dispersions were generally prepared as described in co-pending and co-owned applications application Ser. No. 10/700,859, filed on Nov. 4, 2003, and application Ser. No. 10/701,317, filed on Nov. 4, 2003, hereby incorporated by reference in their entirety.

Materials

Poly(ethylene glycol-co-THF) was obtained by the method disclosed by U.S. Pat. Nos. 4,127,513, 4,139,567, 4,153,186, 4,228,272, 4,235,751; German Pat. Application Nos. DE 86-3606479 and DE 83-3346136; and J. M. Hammond, et al., J. Polym. Sci., Part A, Vol. 9, p. 295 (1971) and Hongzhi Zhang, et al., J. Appl. Polym. Sci., Vol. 73, p. 2303 (1999). PTMEG-1000 and PTMEG-1800 are DuPont Terathane®products. All the glycols were dried at 90° C. under vacuum for 12 h before use. MDI was purified by heating to 50° C. DMPA, MEK, TEA and SDBS were purchased and were used without further purification. The mixers used to make the dispersions are IKA®mixer, model T25 BASIC SI, IKA®Works, Inc and Ross mixer/emulsifier, model HSM-110LC, Charles Ross and Son Company. The IKA® mixer was operated at 11,000 rpm, and the Ross mixer was operated between 7,000 and 8,000 rpm.

General Procedure to Prepare Aqueous-Polyurethane Dispersion

Prepolymer was prepared by mixing MDI, glycol (and DMPA if necessary) at 90° C. for 3-5 h under nitrogen. The amount of excess NCO remained after the coupling reaction was determined by titration. When a solvent was used to dilute the prepolymer, a solvent was added typically to make a 75% weight solution after the reaction product was cooled to room temperature. The prepolymer was placed into a tube and was slowly added into chilled aqueous solution containing surfactant and occasionally base via pneumatic air pump. Solids content of the dispersion is about 10-30%.

Method of Forming Gloves

To form a glove, a mold is dipped into a coagulant solution. This coagulant solution is typically 10-20% Ca($NO_3$)$_2$ and 0-10% $CaCO_3$. The mold is then dried at 100° C. for 5 minutes. This mold is then dipped into an aqueous polyurethane dispersion at 10-50° C., and then cooled at 10-40° C. A salt leaching then takes place by dipping the coated mold into water at 20-70° C., and is then subsequently dried for 30 minutes at between 90 and 150° C. The glove is then stripped off of the mold.

Example 1

156.4 g (0.624 mole) of MDI was mixed with 391 g (0.391 mole) PTMEG-1000 glycol and 19.9 g (0.149 mole) DMPA (make 3.5 wt % of total) in a three-neck round bottom flask in dry box. The flask was then moved into hood and equipped with an overhead stirrer. The mixture was stirred under nitrogen at 90° C. for 4 h. Titration of the mixture shows the NCO content is 5.32%.

200 ml of MEK was added into this mixture and made a solution of 74% solids in MEK. The glycol/MEK solution was then slowly added via caulking tube into 4 liters of 2% SDBS solution with 15 g of TEA at 0° C. The ratio of TEA to DMPA was 1:1. The dispersion was made with Ross mixer and small amount of precipitate was observed. A final 11.5% dispersion of solids content was obtained after precipitate was filtered. The particle size of the precipitate as measured by the Coulter N4MD Analyzer was 1063 nm. The molecular weight of the resulting material was 237,000 as measured by GPC (polystyrene standard).

Comparative Example A

A mixture was made as described in Example 3 above, except that no SDBS surfactant was added, and 1.7 g NaHCO$_3$ was used as a base. The ratio of NaHCO$_3$ to DMPA is 1:1. No dispersion resulted.

A similar mixture was once again made, but this time a solution of 2 wt % SDBS surfactant in NaHCO$_3$ was added. Precipitation was observed. A 8.2 wt % solid content dispersion was obtained after the precipitate was filtered off. Although a film was cast, it had little strength.

Comparative Example B 78 g (0.624 mole) of MDI was mixed with 360 g PTMEG-1800 glycol and 16 g DMPA (make 3.5 wt % of total) in a three-neck round bottom flask in dry box. The flask was then moved into hood and equipped with an overhead stirrer. The mixture was stirred under nitrogen at 90° C. for 4 h. Titration of the mixture shows the NCO content is 5.32%.

400 ml of MEK was added into this mixture. 204 g of glycol/MEK solution was then slowly added via caulking tube into 1.1 liters of 2% SDBS solution with 2.85 g of TEA at 0° C. The ratio of TEA to DMPA is 1:1. No dispersion resulted from this mixture.

When the same procedure was used, except that NaHCO$_3$ was used as the base, a sponge-type polymer was formed.

Comparative Example C

The experiment as described in Comparative Example B above was performed, except that a 30% EO/THF material (from Sanyo) was used. No dispersion was made when 2% surfactant/TEA was used, and a large amount of precipitation was noted.

Again, no dispersion was noted when the experiment as described in the paragraph above was run with 0.5% surfactant/NaHCO$_3$. A large amount of precipitation was noted.

Comparative Example D

The procedure as described in Example 3 above was followed, except that a 1.25% surfactant/NaHCO3 solution was used. Precipitation was observed. A 10.1% solids content dispersion was obtained after the precipitate was filtered off. The film was cast after water was evaporated. The film showed insufficient elasticity.

Testing Results of Articles Made from Aqueous Dispersions

The puncture strength of gloves made from the dispersions by the method described above was measured according to ASTM Method F1342. The elongation and thickness of the materials were measured. The puncture load was calculated as lbs/inch of thickness. The results are found in Table 1 below.

TABLE 1

| Glove ID | Puncture Load (lbs) | Elongation (in) | Thickness (in) | Puncture Load/ Thickness (lbs/in thick) |
|---|---|---|---|---|
| Lycra ® gloves | 1.20 | 0.4040 | 0.0038 | 320 |
| CR100 Latex - Baxter | 0.71 | 0.5039 | 0.0087 | 82 |
| Hypoclean Critical | 0.66 | 0.4742 | 0.0077 | 85 |
| Hypoclean 100 | 0.77 | 0.5282 | 0.0085 | 91 |
| Certi Clean Latex | 0.61 | 0.4679 | 0.0077 | 79 |
| CR10 Nitrile | 1.40 | 0.4974 | 0.0049 | 287 |
| Nitrilite | 1.45 | 0.2830 | 0.0047 | 311 |
| Hypoclean Nitrile | 1.49 | 0.3387 | 0.0047 | 318 |
| Nitrilon | 1.77 | 0.3995 | 0.0049 | 363 |
| Niprotect 529 | 1.70 | 0.4178 | 0.0042 | 407 |
| Trilites | 0.34 | 0.4488 | 0.0053 | 64 |
| PVC | 0.50 | — | 0.0064 | 80 |
| DuPont Ag PUU | 0.89 | 0.4929 | 0.0029 | 281 |

The tear strength of the gloves made by this invention were tested using ASTM method D-624-98. This test requires cutting of films with a die, then putting the samples in an Instron® unit so they tear. The load versus extension is recorded. Dies B and C were used. Specimens for Die B were nicked with a razor to ensure the location of the initial tear. Die C has a sharp 90 degree corner as the location for tearing and was not nicked. The results of the tests are found in Table 2 below, and show the tear strength per unit thickness (N/mm).

TABLE 2

| Glove ID | Tear Strength, Die B (N/mm) | Tear Strength, Die C (N/mm) |
|---|---|---|
| Lycra ® gloves | 95.36 | 74.79 |
| CR100 Latex | 63.25 | 45.47 |
| CR10 Nitrile | 15.53 | 23.76 |
| Nitrilite | 18.98 | 34.03 |
| DuPont Aq. PUU | — | 25.82 |

What is claimed is:

1. An article made from a polyureaurethane aqueous dispersion; said dispersion comprising a water miscible organic solvent and a polyureaurethane comprising a THF copolymer soft segment comprising 25 to 60 percent by weight of ethylene glycol as a comonomer and an aromatic diisocyanate.

2. The article of claim 1, wherein said article is selected from the group consisting of gloves, finger cots and condoms.

3. The article of claim 1, having a tensile strength of greater than 2030 psi.

4. The article of claim 1, having a puncture strength of at least 200 lb/in.

5. The article of claim 1, having a tear strength per thickness of material of at least 20 Newtons/mm.

6. The article of claim 1, having an improved resistance to solvent attack.

7. A process for producing an article made from a polyureaurethane aqueous dispersion; said dispersion comprising a water miscible organic solvent and a polyureaurethane comprising a THF copolymer soft segment comprising 25 to 60 percent by weight of ethylene glycol as a comonomer and an aromatic diisocyanate, comprising the steps:

a) dipping a mold into a coagulant solution and drying at an elevated temperature;
   b) dipping the coagulant solution-coated mold into an aqueous polyureaurethane dispersion and drying;
   c) subjecting the coated mold to a salt leaching bath; and drying the coated mold at elevated temperature before stripping the article off of said mold.

\* \* \* \* \*